(12) United States Patent
Olsen

(10) Patent No.: US 8,930,822 B2
(45) Date of Patent: Jan. 6, 2015

(54) METHOD FOR HUMAN-CENTRIC INFORMATION ACCESS AND PRESENTATION

(75) Inventor: Øystein Haug Olsen, Oslo (NO)

(73) Assignee: Microsoft Corporation, Redmond, WA (US)

(*) Notice: Subject to any disclaimer, the term of this patent is extended or adjusted under 35 U.S.C. 154(b) by 547 days.

(21) Appl. No.: 12/645,810

(22) Filed: Dec. 23, 2009

(65) Prior Publication Data

US 2011/0004829 A1    Jan. 6, 2011

(30) Foreign Application Priority Data

Dec. 23, 2008  (NO) .................................... 20085369

(51) Int. Cl.
| | | |
|---|---|---|
| *G06F 3/00* | (2006.01) | |
| *G06F 17/30* | (2006.01) | |
| *G06F 17/27* | (2006.01) | |

(52) U.S. Cl.
CPC ........ G06F 17/30864 (2013.01); *G06F 17/276* (2013.01)
USPC ............ 715/745; 715/742; 715/743; 715/744

(58) Field of Classification Search
CPC .................................................. G06F 17/276
See application file for complete search history.

(56) References Cited

U.S. PATENT DOCUMENTS

| | | | |
|---|---|---|---|
| 6,693,651 B2* | 2/2004 | Biebesheimer et al. ...... | 715/837 |
| 6,778,193 B2* | 8/2004 | Biebesheimer et al. ...... | 715/805 |
| 7,035,864 B1 | 4/2006 | Ferrari | |
| 7,062,483 B2 | 6/2006 | Ferrari | |
| 7,620,631 B2* | 11/2009 | Paek et al. ............................. | 1/1 |
| 7,689,921 B2* | 3/2010 | Rajarajan et al. ............. | 715/744 |
| 2002/0105550 A1* | 8/2002 | Biebesheimer et al. ...... | 345/835 |
| 2006/0212817 A1* | 9/2006 | Paek et al. ..................... | 715/745 |

FOREIGN PATENT DOCUMENTS

WO    WO 2006/121338 A2    11/2006

OTHER PUBLICATIONS

Fred et al., "The Case for Portlets", IBM®, Feb. 1, 2003, 11 pages.
Miller, George A.., "The Magical Number Seven, Plus or Minus Two: Some Limits on our Capacity for Processing Information", Classics in the History of Psychology, 1956, 16 pages.
Tag Cloud, Wikipedia, Dec. 16, 2008, 4 pages.

* cited by examiner

*Primary Examiner* — William Titcomb
(74) *Attorney, Agent, or Firm* — Tom Wong; Jim Ross; Micky Minhas

(57) ABSTRACT

In a method for composing and presenting information in a user context, the information shall be presented for the user on a man-machine interface in the form of a visual or graphic display. The method comprises steps for determining a user context in which the information is required, selecting a set of content sources, and the content components are retrieved from the content sources. The information in selected content components are computed using an information measure that reflects the information as perceived by human cognition, and an optimum presentation of the selected content components are determined and presented for the user.

20 Claims, 15 Drawing Sheets

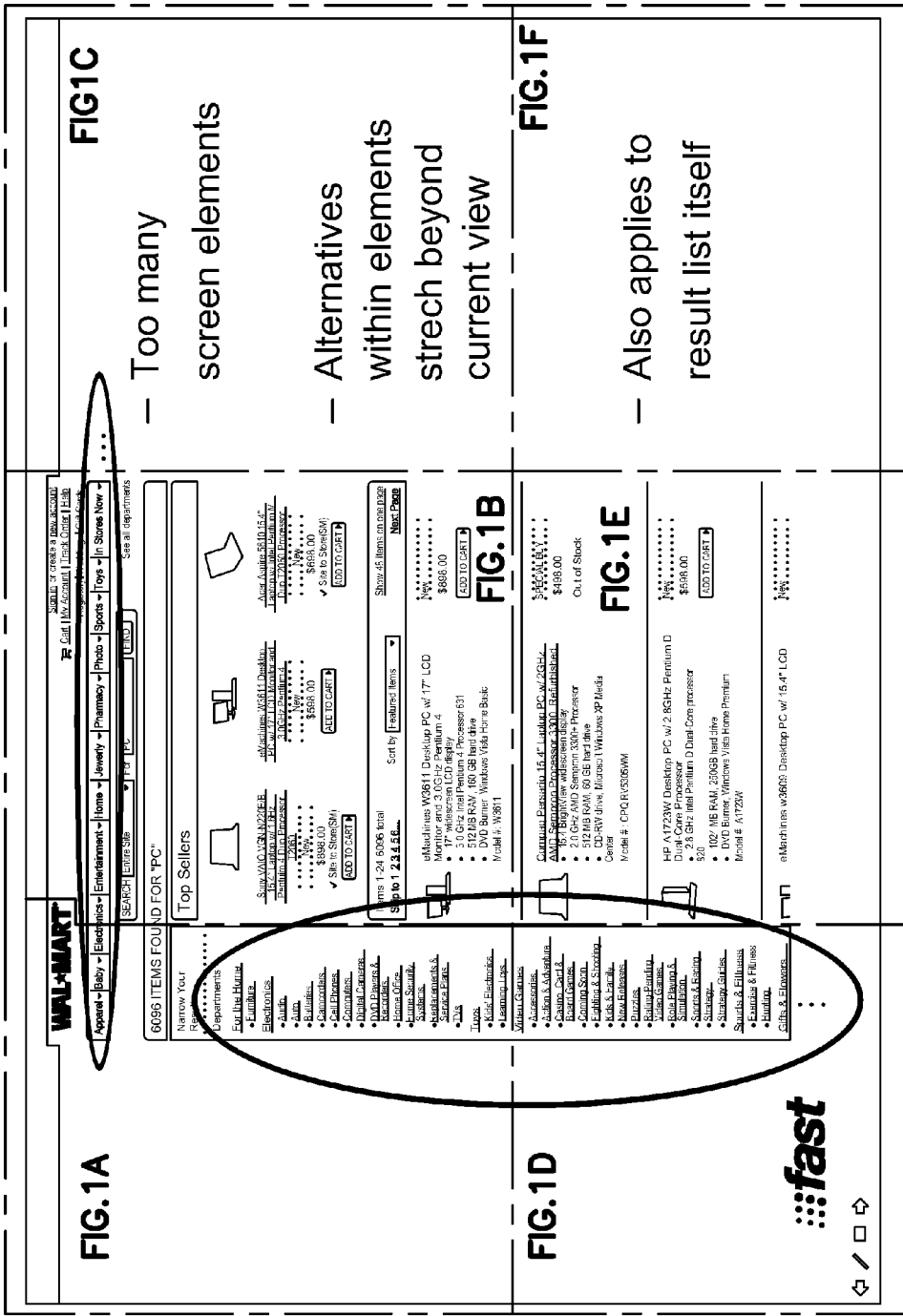

FIG. 1B

Sign in or create a new account
🛒 Cart | My Account | Track Order | Help

| nics▾ | Entertainment ▾ | Home ▾ | Jewerly ▾ | Pharmacy ▾ | Photo ▾ | Sports ▾ | Toys ▾ | In Stores Now ▾ |

SEARCH [Entire Site ▾] For [PC] [FIND]   See all departments

ND FOR "PC"

Top Sellers

Sony VAIO VGN-N220E/B 15.4" Laptop w/ 1.6Hz Pentuim 4 Duo Processor T2060
New
$898.00
✓ Site to Store(SM)
[ADD TO CART ▷]

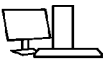

eMachines W3611 Desktop PC w/ 17" LCD Monitor and 3.0GHz Pentium 4
New
$598.00
[ADD TO CART ▷]

Acer Aspire 5610 15.4" Laptop w/ Intel Pentium M Duo T2060 Processor
New
$698.00
✓ Site to Store(SM)
[ADD TO CART ▷]

Items 1-24 6096 total
Ship to 1 2 3 4 5 6...     Sort by: [Featured Items ▾]     Show 48 items on one page
                                                            Next Page

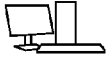  eMachines W3611 Desktop PC w/ 17" LCD Monitor and 3.0GHz Pentium 4
• 17" widescreen LCD display
• 3.0 GHz Intel Pentium 4 Processor 631
• 512 MB RAM, 160 GB hard drive
• DVD Burner, Windows Vista Home Basic
Model #: W3611

New
$898.00
[ADD TO CART ▷]

FIG. 1E

Compaq Persario 15.4" Laptop PC w/ 2GHz
AMD Sempron Processor 3300, Refurbished
 • 15.4 BrightView widescreen display
 • 2.0 GHz AMD Sempron 3300+ Processor
 • 512 MB RAM, 60 GB hard drive
 • CD-RW drive, Microsoft Windows XP Media
Center
Model # : CPQ RV5305WM SPECIAL BUY
$498.00
Out of Stock

HP A1723W Desktop PC w/ 2.8GHz Pentium D
Dual-Core Processor
 • 2.8 GHz Intel Pentium D Dual-Core processor
820
 • 1024 MB RAM, 250GB hard drive
 • DVD Burner, Windows Vista Home Premium
Model #: A1723W New
$598.00
[ ADD TO CART ▶ ]

eMachines w3609 Desktop PC w/ 15.4" LCD

New

FIG. 1F

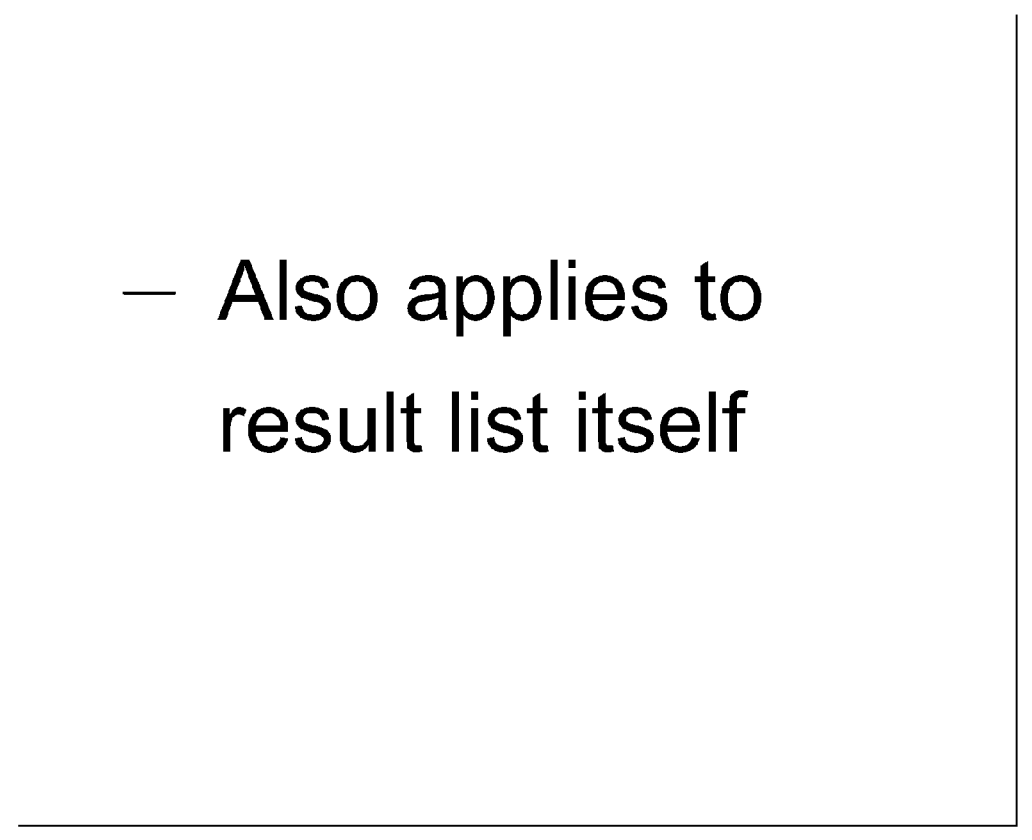

— Also applies to result list itself

FIG. 3

301
SØKESPØRSMÅL
TORSTEIN THORSEN

303
REGION
EAST NORWAY (2)
MIDDLE NORWAY (4)
SOUTHERN NORWAY (1)
WESTERN NORWAY (7)

302
RESULTATLISTE

YOUR QUERY GAVE A TOTAL OF 14 HITS

TORSTEIN THORSEN
SOLEIEVEIEN 9, 4100
JØRPELAND

TORSTEIN THORSEN
FJELDHAGEN 43 4046
HAFRSFJORD

TORSTEIN THORSEN
STOVNERVEIEN 31, 0982 OSLO

TORSTEIN THORSEN
SKORVAV. 29 5306 ERDAL

...

304
FORNAVN
TORSTEIN (10)
TORSTEIN ALEKSANDER (1)
TORSTEIN ASGAUT (2)
TORSTEIN M (1)

305
ETTERNAVN
THORSEN (13)
TORSEN (1)

PERSONS RELATED TO "SOCCER"

| NON-CONTEXTUAL DOCUMENT 401 | CONTEXTUAL NAVIGATION PARAGRAPH 402 | SENTENCE 403 |
|---|---|---|
| Jack Nicklaus (~10.0%) | Diego Maradona (~4.0%) | Diego Maradona (~4.0%) |
| Fred Davis (~10.0%) | David Beckham (~4.0%) | David Beckham (~4.0%) |
| Billie Jean King (~8.0%) | Alan Shearer (~3.0%) | Freddy Adu (~3.0%) |
| Richard Nixon (~8.0%) | Michelle Akers (~3.0%) | Michelle Akers (~3.0%) |
| John Wayne (~7.0%) | Mia Hamm (~3.0%) | Alan Shearer (~3.0%) |
| Margaret Smith (~7.0%) | Eric Wynalda (~3.0%) | George Best (~2.0%) |
| Joe Frazier (~7.0%) | Freddy Adu (~3.0%) | Bobby Moore (~2.0%) |
| Irina Rodnina (~7.0%) | Michel Platini (~2.0%) | Mia Hamm (~2.0%) |
| Mao Zedong (~6.0%) | Stanley Matthews (~2.0%) | Stanley Matthews (~2.0%) |
| Gordie Howe (~6.0%) | Oliver Neuville (~2.0%) | Michel Platini (~2.0%) |
| Richard m. Nixon (~6.0%) | Bobby Moore (~2.0%) | Oliver Neuville (~2.0%) |
| John Pulman (~6.0%) | Franz Beckenbauer (~2.0%) | Jack Charlton (~2.0%) |
| Queen Elizabeth II (~5.0%) | Douglas Hyde (~2.0%) | Lev Yashin (~2.0%) |

FIG. 4

| 1 | U.S.A. | 1033 | 22% |
|---|---|---|---|
| 2 | Canada | 986 | 21% |
| 3 | U.K. | 700 | 15% |
| 4 | France | 698 | 15% |
| 5 | Italy | 500 | 11% |
| 6 | Germany | 499 | 11% |
| 7 | Belgium | 209 | 4% |
| 8 | Portugal | 20 | 0% |
| 9 | Ireland | 19 | 0% |
| 10 | Norway | 19 | 0% |
| 11 | Denmark | 19 | 0% |
| 12 | Iceland | 15 | 0% |
| 13 | Sweden | 10 | 0% |
| 14 | Chile | 9 | 0% |
| 15 | Burma | 9 | 0% |

901 "Blend"

| 1 | U.S.A. | 954 | 15% |
|---|---|---|---|
| 2 | Canada | 802 | 12% |
| 3 | U.K. | 700 | 11% |
| 4 | France | 698 | 11% |
| 5 | Italy | 550 | 9% |
| 6 | Germany | 520 | 8% |
| 7 | Belgium | 480 | 7% |
| 8 | Portugal | 440 | 7% |
| 9 | Ireland | 419 | 7% |
| 10 | Norway | 408 | 6% |
| 11 | Denmark | 200 | 3% |
| 12 | Iceland | 115 | 2% |
| 13 | Sweden | 56 | 1% |
| 14 | Chile | 49 | 1% |
| 15 | Burma | 34 | 1% |

903 "Many"

| 1 | U.S.A. | 954 | 55% |
|---|---|---|---|
| 2 | Canada | 100 | 6% |
| 3 | U.K. | 89 | 5% |
| 4 | France | 85 | 5% |
| 5 | Italy | 79 | 5% |
| 6 | Germany | 79 | 5% |
| 7 | Belgium | 76 | 4% |
| 8 | Portugal | 75 | 4% |
| 9 | Ireland | 73 | 4% |
| 10 | Norway | 71 | 4% |
| 11 | Denmark | 19 | 1% |
| 12 | Iceland | 15 | 1% |
| 13 | Sweden | 10 | 1% |
| 14 | Chile | 9 | 1% |
| 15 | Burma | 9 | 1% |

902 "Few"

| 1 | U.S.A. | 100 | 14% |
|---|---|---|---|
| 2 | Canada | 100 | 14% |
| 3 | U.K. | 100 | 14% |
| 4 | France | 100 | 14% |
| 5 | Italy | 100 | 14% |
| 6 | Germany | 100 | 14% |
| 7 | Belgium | 100 | 14% |

904 "7 like"

| 1 | U.S.A. | 100 | 7% |
|---|---|---|---|
| 2 | Canada | 100 | 7% |
| 3 | U.K. | 100 | 7% |
| 4 | France | 100 | 7% |
| 5 | Italy | 100 | 7% |
| 6 | Germany | 100 | 7% |
| 7 | Belgium | 100 | 7% |
| 8 | Portugal | 100 | 7% |
| 9 | Ireland | 100 | 7% |
| 10 | Norway | 100 | 7% |
| 11 | Denmark | 100 | 7% |
| 12 | Iceland | 100 | 7% |
| 13 | Sweden | 100 | 7% |
| 14 | Chile | 100 | 7% |
| 15 | Burma | 100 | 7% |

905 "15 like"

|  | Information |
|---|---|
| Few | 2.572 |
| 7 like | 2.807 |
| Blend | 2.854 |
| Many | 3.544 |
| 15 like | 3.907 |

906 "Information ranking"

FIG. 9

| 1 | U.S.A.  | 1033 | 22% |
|---|---------|------|-----|
| 2 | Canada  | 986  | 21% |
| 3 | U.K.    | 700  | 15% |
| 4 | France  | 698  | 15% |
| 5 | Italy   | 500  | 11% |
| 6 | Annet   | 828  | 17% |

1001 "Blend"

| 1 | U.S.A. | 954 | 55% |
|---|--------|-----|-----|
| 2 | Annet  | 789 | 45% |

1002 "Few"

| 1 | U.S.A.  | 100  | 7%  |
|---|---------|------|-----|
| 2 | Canada  | 100  | 7%  |
| 3 | U.K.    | 100  | 7%  |
| 4 | France  | 100  | 7%  |
| 5 | Annet   | 1000 | 67% |

1005 "5 like"

| 1  | U.S.A.   | 954  | 15% |
|----|----------|------|-----|
| 2  | Canada   | 802  | 12% |
| 3  | U.K.     | 700  | 11% |
| 4  | France   | 698  | 11% |
| 5  | Italy    | 550  | 9%  |
| 6  | Germany  | 520  | 8%  |
| 7  | Belgium  | 480  | 7%  |
| 8  | Portugal | 440  | 7%  |
| 9  | Ireland  | 419  | 7%  |
| 10 | Annet    | 862  | 13% |

1003 "Many"

| 1 | U.S.A.  | 100 | 14% |
|---|---------|-----|-----|
| 2 | Canada  | 100 | 14% |
| 3 | U.K.    | 100 | 14% |
| 4 | France  | 100 | 14% |
| 5 | Italy   | 100 | 14% |
| 6 | Germany | 100 | 14% |
| 7 | Belgium | 100 | 14% |

1004 "7 like"

|         | Information density |
|---------|---------------------|
| Few     | 0.497               |
| Blend   | 0.424               |
| 7 like  | 0.401               |
| Many    | 0.327               |
| 15 like | 0.274               |

1006 "Information density ranking"

FIG. 10

METHOD FOR HUMAN-CENTRIC INFORMATION ACCESS AND PRESENTATION

This application claims benefit of Serial No. 20085369, filed 23 Dec. 2008 in Norway and which application is incorporated herein by reference. To the extent appropriate, a claim of priority is made to the above disclosed application.

BACKGROUND

Traditionally, huge amounts of information have required carefully cataloguing by a manual process in order to make it retrievable. The information is accessed by means of the manually added metadata.

As the Internet emerged, the initial mode of access was via directories that manually classify pages and sites on the Internet. These directories, such as Yahoo (www.yahoo.com) and the Open Directory Project (www.dmoz.org), still exist, but as the content volume grows faster than the capacity of manually classifying content, these directories are replaced or complemented with search-based information access patterns based on information retrieval methods.

Web directories have been generalized to portals. A portal presents information from a variety of sources, including typical non-Internet content, e.g. relational databases, applications, all within a consistent framework for the developer, look and feel for the consumer, and a unified security model across all sub-systems exposed as single sign-on to the information consumer and with corresponding content entitlement. Enterprise portals are commonly used to integrate a range of internal and external enterprise systems and data repositories.

A page in the portal is composed of several portlets, where a portlet represents the information from a single source. The developer states rules for which portlets are to appear on what page and where on the page they are to appear. The presentation can also be targeted to presentation devices, e.g. the limited screen estate on hand-held devices. Several big software companies provide portal products for the system integration. (For more information, see http://www-128.ibm.com/developerworks/ibm/library/i-portletintro/)

When an information consumer accesses information, the query is more or less explicit. The consumer can spell out a query if a suitable device is at hand. On a mobile device with limited textual input, it is desired to reduce the burden to spell out long queries. The context of the user as information is sought contributes implicitly to the query. For example, the query can be implicitly extended and directed to appropriate content depending on whether the user is at home or at work. The position of the consumer can give clues to what geospatial content is relevant.

The integration of search in a portal framework may simply choose to use a single portlet for the search. A more advanced integration makes separate portlets for the search box, the result list, and each of the navigators.

The presentation of query feedback (spelling suggestions, definitions, etc), the result list, and navigators in a portal framework is subject to rules specified by the developer. The size, position, and order are defined manually in advance based on assumptions and generalizations, optimizing the consumer experience for the least work required by the developer.

Discussion of the Problem

A portal aims to be the central point for any information requirement. By nature, it has to care for a wide range of information needs, for example high-level content aggregation and overviews, lower level knowledge investigation, specific fact finding, and retrieving a specific document the user has in mind.

Generally, the portal designer anticipates a pattern of use cases and defines a common layout across all use cases. At best, a few use cases have been identified that are central to the enterprise, and separate user interfaces have been geared towards these scenarios. Each of these tailor-made interfaces requires a significant amount of investment in identifying, developing, and testing the application logic and the usability of the presentation.

Thus, the user interfaces are based on crisp rules on what information components (portlets) are included, where they are positioned, and the presentation size. The rules are typically based only on user attributes, e.g. access rights, interest group, office location, and possibly on the device type. For example, a huge or client specific portlet may only be viewed on devices with sufficient screen estate. In general, it is hard and expensive to define one presentation layout that covers all information needs, and general layouts give unsatisfactory usability.

When screen estate is limited, it is hard to make correct a priori selections of portlets. The user may easily find it very hard to access the desired information as the correct elements for the given context are not included on e.g. a small hand-held device.

On large screens, however, portals tend to suffer from information overload. The portal designer incorporates a lot of content in order to increase the likelihood of presence of some appropriate content, and the content consumer experiences information overload. The consumer has to scan pages that are visually complex: there are many components of different structures and the pages may span several screens on the device. This cognitive distillation of the alternative information components is a stress factor for humans.

FIG. 6 is an example of an information presentation that suffers from information overflow. A user carrying out a task will need considerable time to digest the information in order to build a mental model of the structure of the presentation and the information within it. In many tasks involving search, users are not prepared to operate in such a mode. They expect the required information at most a few clicks away and within a few seconds. The presentation in FIG. 6 specifically suffers from too many content components (screen elements) and that several of the content components stretch beyond the current view.

Specifically in search systems, navigators are used to refine or otherwise manipulate search results in a user-friendly manner. However, on any result screen there is only space for a few navigators. While the available set of meta-data is very large, the choice of the best navigators is often limited, static and suboptimal. Navigator selection is either static or based on hard-coded rules applied at query time, with the risk of including irrelevant and excluding relevant navigators.

Individual navigators are often polluted by noisy elements. Low probability values are presented throughout navigators where the elements are ranked by value (e.g. with hierarchical/tree-like navigators) and at the end where the elements are ranked by probability/frequency. Such elements do not offer a likely query refinement for the end-user and should be removed (or grouped in an "other" option) in order to make the most efficient use of the presentation space. For example, there is no point in showing a drill-down option that includes 97% of the result set, even though it is the most prominent value within the current result set. Likewise, a drill-down option that includes 1% of the result set is most likely not interesting when there are three options that each account for more than 20% of the result set.

Both the physical exclusion and the information overload reduces the usability and the effectiveness of portals, resulting in reduced turnover in an e-commerce setting, customers leaving the site and reduced stickiness, reduced productivity of employees, etc.

The cost of improving the usability for specific use cases by extending the layout rules is prohibitive with current systems. Moreover, the portal frameworks are not geared towards the cooperative information coordination between portlets. The idea of independent, reusable information components is good for the portal designer but tend to contradict the ease of information consumption unless there is a common cognitive model behind the portal (and the portlets). Simply including many information views (portlets), there is no guarantee that these are orthogonal views of the content in question, and the portal designer has no support from the portal framework to judge (and define rules) to present the content most effectively on the given screen real estate.

As systems for information access, search and retrieval are becoming more sophisticated with search engines that not only search the content and present a straightforward search result to the user, but also analyze, evaluate and rank the data and moreover are able to create navigation tools offering these for a user, and hence allow for improved discovery for instance of deep and hidden structures in the information content. However, the manner of presenting the results of search and search-derived applications adheres to traditional modes of presentation that does not support user cognition and the presentation of information in a degree that matches the evolving sophistication of systems for search, access and retrieval, or advanced search engines which have been or are being developed for powering such systems. Hence there is a need for optimizing the presentation of information in a user-centric context and particularly improving the presentation for a user.

SUMMARY OF THE INVENTION

The present invention concerns a method for composing and presenting information in a user context, wherein the information comprises content of documents accessed and retrieved in an information search, and wherein information shall be presented for the user on a man-machine interface in the form of a visual or graphic display of a given shape and area.

Particularly the present invention discloses a method for optimizing the screen real estate for an information consumer. The presentation space is reduced by removing irrelevant facets of the information in context and reordering elements such that the most likely elements are positioned in the areas of highest visual impact. Overall, the presentation of the information in context is more compact and less confusing than alternative systems, providing the information consumer with an appropriate high-level overview.

A first object of the present invention is thus to optimize the presentation of information.

A second object of the present invention is to determine the information measure of the retrieved information or content in such a manner that it reflects the information as perceived by human being presented with the content.

Finally, it is also an object of the present invention to take into account various user- and content-related constraints when an optimum content presentation is determined.

The above-mentioned object as well as further features and advantages are realized with a method which is characterized by steps for a) determining a user context in which the information is required, b) selecting a set of content sources, c) populating a set of content components by retrieving and refining content components from the set of content sources, d) computing component information in the content components by means of an information measure that reflects the information as perceived by human cognition, e) determining and composing an optimum presentation of said content components subject to one or more of human cognition constraints, user context constraints, presentation constraints and content constraints, and f) presenting said optimum presentation for the user.

Additional features and advantage of the present invention will be apparent from the appended dependent claims.

BRIEF DESCRIPTION OF THE DRAWINGS

The invention shall be better understood from the following discussion of the general background of the invention, and the necessary conditions for its realization, as well as the disclosure of the method in detail and read in conjunction with the appended drawing figures, of which

FIG. 9 five example input navigators with ranking, and

FIG. 10 five example navigators transformed for human cognition.

DETAILED DESCRIPTION

Huge amounts of valuable business information are stored in enterprise systems and repositories. Business intelligence (BI) tools provide mechanisms and graphical user interfaces to this information in portal-like software products.

Information retrieval has traditionally involved the end user to formulate a query using Boolean operators—either using a query language or via graphical user interface. Execution of the query provides a search result that is a set of matching documents. This result set has generally been a classical crisp set of which a particular document is either a member or not a member.

Throughout this discussion the term "document" will be used to denote for any searchable object, and it could hence mean for instance a textual document, a document represented in XML, HTML, SGML, or an office format, a database object such as record, table, view, or query, or a multimedia object.

Figure 1A:
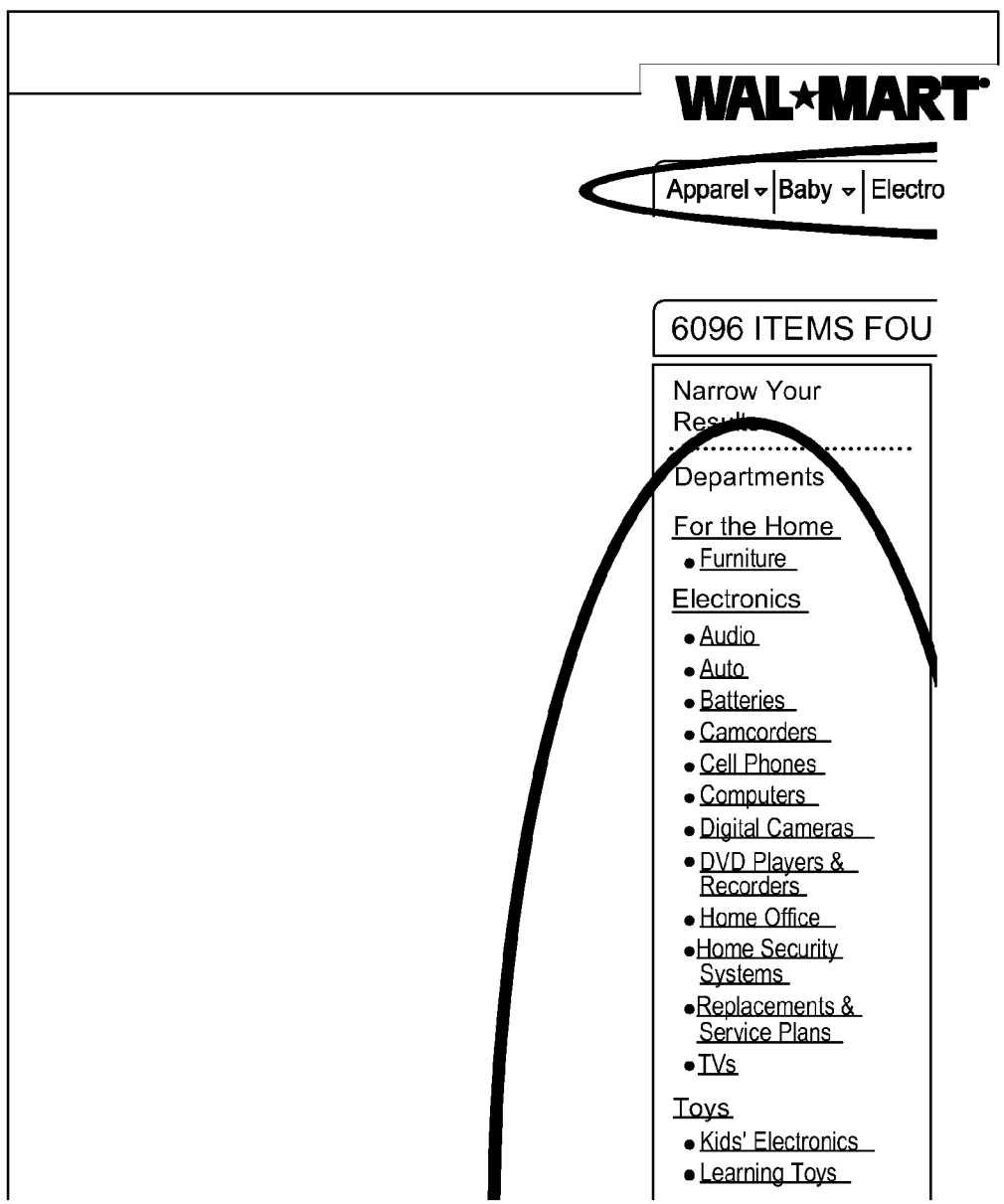
FIG. 1 shows an example of information overflow, as mentioned above FIG. 2 a typical precision vs. recall graph, FIG. 3 document level result set navigators, FIG. 4 contextual navigation for the query "soccer", FIG. 5 human information of choice as number of symbols—mapping traditional information to human-centric information, FIG. 6 grouping noisy entries into a new "other" entry, FIG. 7 ("Less is more") a set of alternative choices of equal probability, FIG. 8 schematically the process flow for an optimized information access.
Figure 1C:
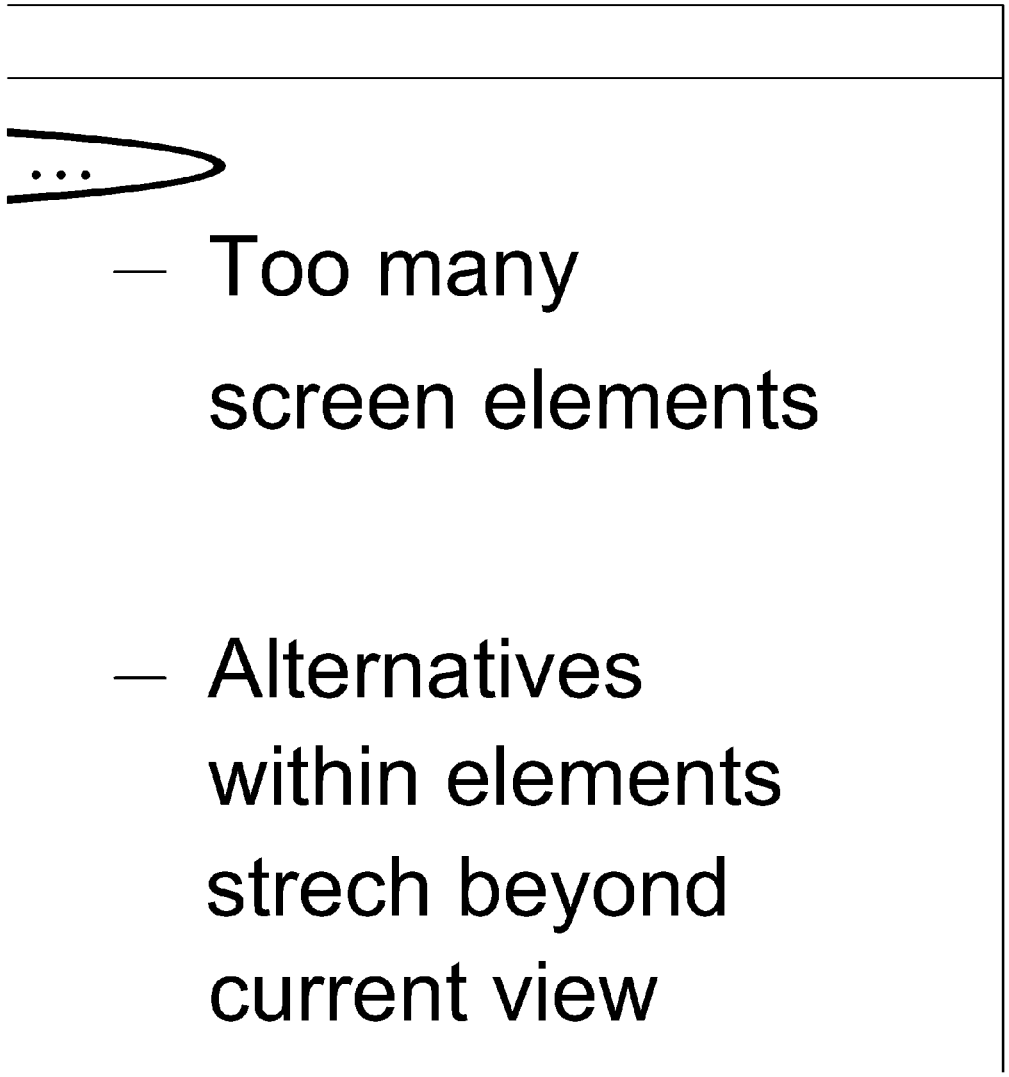
Figure 1D:
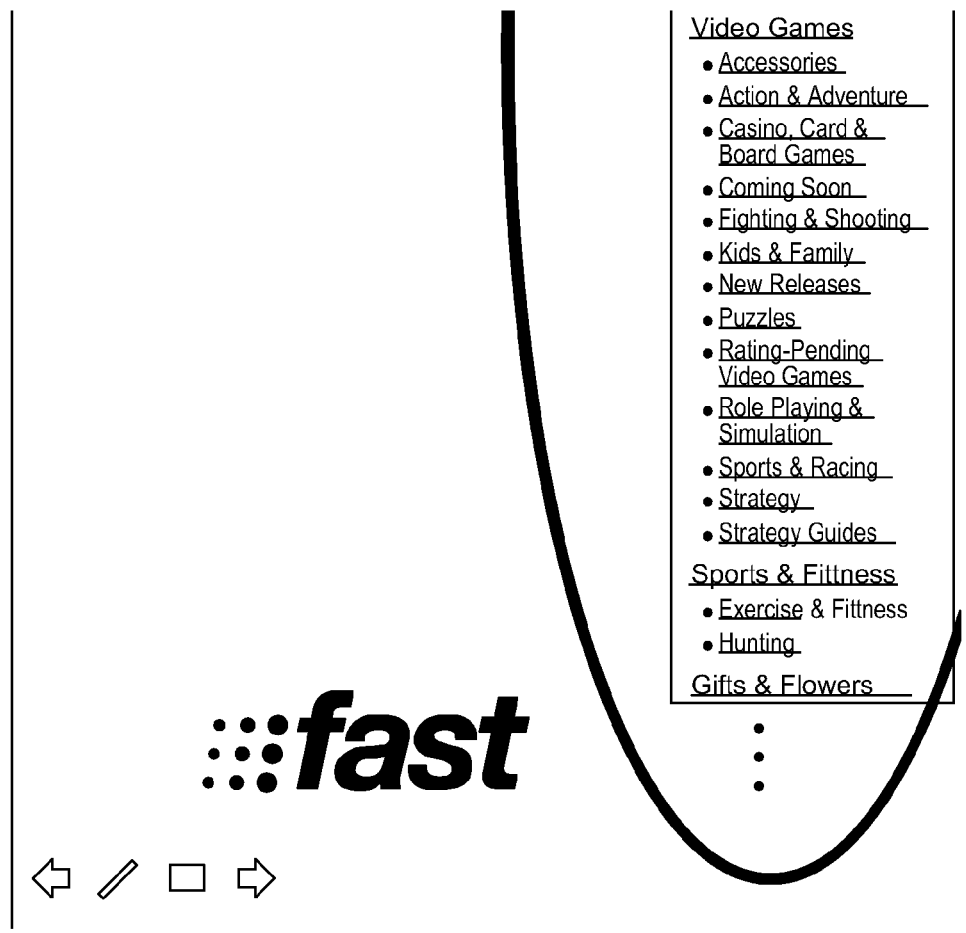
Figure 2:
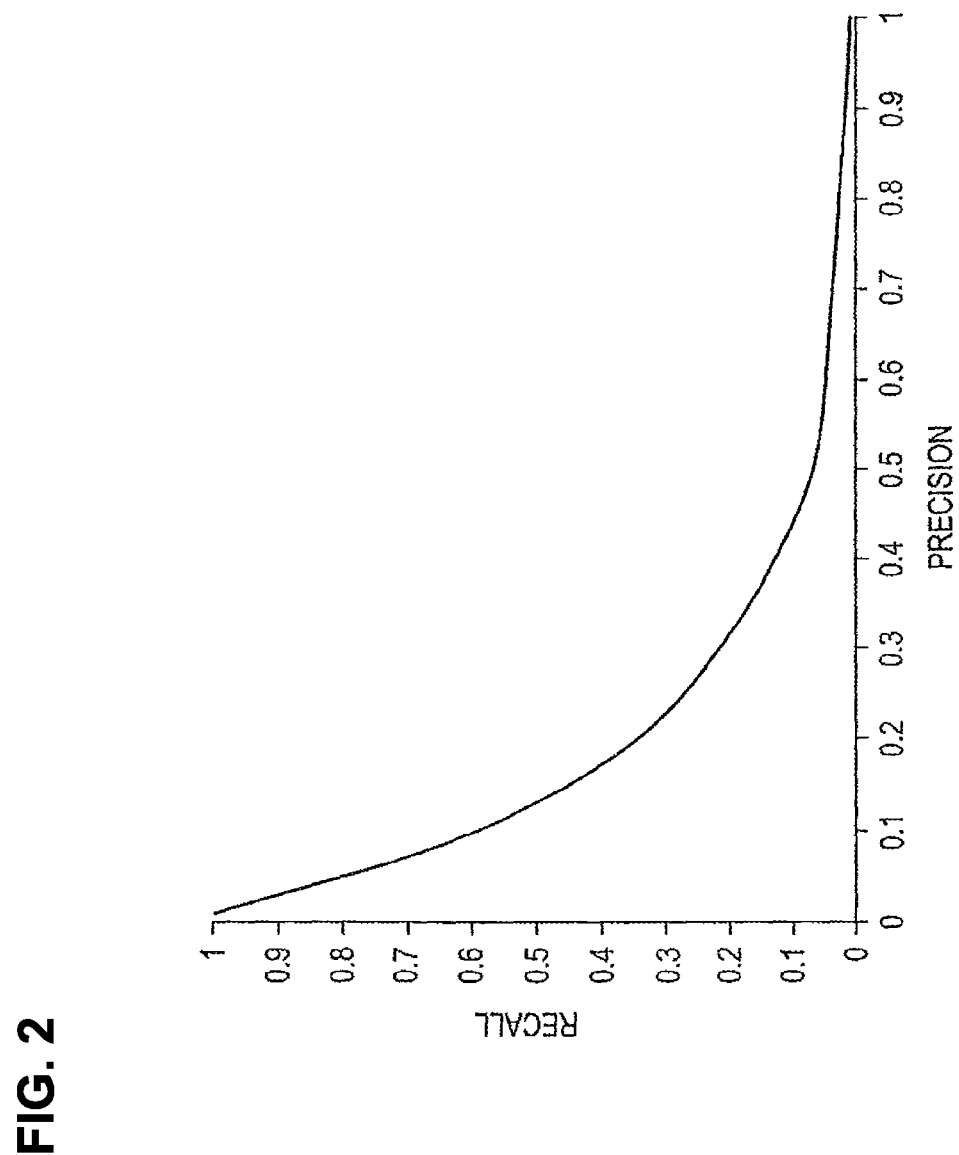

The search quality of the search system is quantified in precision and recall. Both measures assume a certain set of documents, P, is the appropriate result for a given query. The recall is the fraction of P returned in the result set R, i.e. $|R \cap P|/|P|$. The precision is the fraction of R that is relevant, i.e. |R∩P|/|R|. Typical search systems have precision-recall curves showing a trade-off between precision and recall, as shown in FIG. 2. Great precision is only achieved with poor recall and vice versa. The search system is tuned to offer acceptable precision and recall.

However, with huge content volumes where many documents share the same keywords, the result sets become too large to be efficiently presented to a human user. More recently, information retrieval systems calculate a relevance score as a function of the quality of the match between the query and the document, as well as including a priori probabilities that the document is valid for any query (e.g. page rank from Google). The search result is presented ranked according to this relevance score, showing the details of the documents with the highest relevance scores first, usually in hyperlinked pages of 10-20 documents. The concepts of recall and precision are not as clear-cut as for the crisp result sets above, but they still apply. Recall refers to getting relevant documents included in the search result and preferably on the top of the first result page. Precision involves not having irrelevant documents on the first result page.

The user interacts with an information retrieval system (a search engine) by analyzing the search result, viewing result documents, and reformulating the query. The search result is often too general, as the user does not generally know the extent of the collection of documents in the system and thus does not make the query specific enough (i.e. having poor precision). A common query reformulation is to make a query refinement, i.e. selecting a subset of the original search result set in order to improve the precision.

Very recently, information retrieval systems have included the concept of result set navigation (for instance as disclosed in Endeca U.S. Pat. Nos. 7,035,864, 7,062,483, and as used with the enterprise search system ESP™ of the present applicant Fast Search & Transfer AS). A document is associated with multiple attributes (e.g. price, weight, keywords) where each attribute has none, one, or in general multiple values. The attribute value distributions are presented as a frequency histogram either sorted on frequency or value. A navigator is a graphical user interface object that presents the frequency histogram for a given attribute, allowing the user to analyze the result set as well as select an attribute-value pair as a query refinement in a single click. The refinement is instantly executed, and the new result set is presented together with new navigators on the new result set. For example, a search for "skiing" may include a "Country" navigator on the "Country" document attribute (metadata). This navigator contains a value "Norway" suggesting that there is a substantial number of documents in the result set for "skiing" that are associated Norway. When the user selects the "Norway" option in the navigator, the system presents the subset of the "skiing" result set that is further limited to documents associated with Norway.

FIG. 3 shows how the query 301 gives a result set 302 together with navigators on document-level metadata 303-305. In the example, a search 301 for surname "Thorsen" and first name "Torstein" allows the user to refine the first name among those in the result set 304 and to constrain the search to a part of the country 303. For each of the refinements, the size of the result set if the refinement was to be applied is shown.

Navigation includes many concepts of data mining. Traditional data mining is on a static data set. With navigation, data mining is employed on a dynamic per-query result set. Each document attribute represents a dimension/facet in terms of data mining terminology.

Formally, given a query Q, a navigator N on the attribute a having values {v} across a set of documents D has N(Q,a,v) instances of value v. The set of values for attribute a in document d is d(a).

$$N(Q,a,v)=|\{d \text{ in } D:Q \text{ matches } d, v \text{ in } d(a)\}|$$

Both the attribute values v and the document hit count N(Q,a,v) are presented, typically sorted either on the values or document hit count.

Navigation is the application of result set aggregation in the context of a query where a result set summary is presented to the user as well as a query modifier that is incorporated in the query when the user selects a particular object in the summary. The presentation is a view of the result set along an attribute dimension and may include a quality indicator in addition to the attribute value, where the quality usually is the number of documents for a given attribute value or attribute value range.

The ideas below incorporate both aggregation in the general case and specifically the application to navigation. The aggregation can be presented without necessarily linking it to query refinements, or it may be the basis for statistical analysis without even being presented. Also, the information retrieval system may choose to automatically select such query refinements based on an analysis of the query, the result set, and the navigators/aggregations associated with the result set.

The document-global attributes (metadata) are either explicit in the document or structured database records or automatically discovered attributes in the unstructured content of a document using techniques from the field of information extraction. In hierarchical structured content (e.g. from XML), sub-document elements can be explicitly associated with attributes. Automatically extracted information can be associated at the global document level and at the contextual (sub-document) level, e.g. at sentence elements. The sub-document elements can be explicit in the content (e.g. paragraphs in HTML) or automatically detected (e.g. sentence detection). The distinction between attributes and elements is with respect to the visible content flow: the content of elements is visible whereas the attributes are invisible metadata on the elements. For example, the content of sentence elements is visible including entity sub-elements (e.g. person names), but the sentiment attribute on a sentence element should not interfere with the content flow, e.g. phrase search across sentences. Likewise, an entity element contains the original content while an attribute contains the normalized version of the content that is used for search and analysis. For example, the text "yesterday" is wrapped in a date entity with an attribute containing the concrete date value normalized to the ISO 8601 standard as derived from the context.

The present applicant has recently introduced a method for contextual navigation (Contextual Insight™) on sub-document elements, e.g. paragraphs and sentences as described in e.g. International published application No. WO 2006/121338, assigned to Fast Search & Transfer AS. Entities are extracted from e.g. sentences and marked up as sub-elements of the sentence elements or as attributes on the sentence elements. The search system allows e.g. specific sentences to be selected by a query and navigation on the sentence sub-elements/attributes. For example, a query may select sentences containing "Bill Clinton" in a "person_name" sub-element and present a navigator on the "date" sub-element of those sentences. Such navigators are found to be much more relevant than equivalent document-level navigators on entities extracted from unstructured natural language content.

FIG. 4 shows an example of contextual navigation and particularly aggregations of persons associated with the query "soccer" at the document 401, paragraph 402, and sentence level 403, clearly showing semantically more correct aggregations at the paragraph and sentence contexts than at the document level.

Sometimes a user will request specify a detailed query, and the result set will have too specific (or none) documents (i.e. poor recall). Some search systems allow the user to simply increase the recall, e.g. by enabling lemmatization or stemming that enables matching of alternative surface forms, i.e. matching different tenses of verbs, singular/plural of nouns, etc. Other recall enhancing measures are enabling synonymy, going from a phrase search to an "all words" search, and going from an "all words" search to an "n of m" (or "any") search. Spell checking may work either way, improving recall or precision.

In order to scale for high-volume applications, search solutions have developed from software libraries handling all aspects of the search linked into a single application running on one machine, to distributed search engine solutions where multiple, sometimes thousands, machines are executing the queries received from external clients. This development allows the search engine to run in a separate environment and to distribute the problem in an optimal manner without having external constraints imposed by the application.

The basis for performance, scalability, and fault-tolerance is the partitioning of the searchable documents into partitions handled on separate machines, and the replication of these partitions on other machines. In the search engine, the query is analyzed and then dispatched to some or all the partitions, the results from each partition are merged, and the final result set is subject to post processing before being passed on to the search client. Performance and fault-tolerance is increased by replicating the data on new machines. The search engines scales for more content by adding new partitions.

Now the constructive realization and the central features of the method of the present invention shall be discussed in greater detail with main emphasis on embodiments of the access and presentation method based on using result set aggregations in the form of navigators and ranking in order to provide an optimum presentation.

Formally, a navigator n contains a set of |n| unique entries. An entry has a value i and has a probability $n\_i$. The probability of an entry $n\_i$ is defined as the fraction of the documents in the current context (search result set) that has the value i for the facet used for the navigator n.

According to traditional information theory, the information in a navigator n is the entropy $$H(n) = -\text{sum}\_i\, n\_i \log n\_i$$

where $n\_i$ denotes the probability of value i in the navigator. To rank navigators based on this entropy alone is ineffective on a search result page; a navigator where each document in the result set has a unique value will have the highest entropy. Such a navigator occupies a huge presentation space and is practically useless for a human end-user. On the other hand, a single drill-down option offers very little information, and in particular, if all documents contains the entry (it has probability one), it has no value for drilling down.

Research shows that a human mentally maximally comprehends about 7 items in a given cognitive task. In cognitive psychology, George A. Miller coined the concept "The magical number seven, plus or minus two" in 1956, suggesting the channel capacity for human cognitive tasks is limited to 5-9 choices or around 2.8 bits of information.

The document model can contain many facets by which one may want to narrow the search via navigators. With limited computational resources (CPU, disk bandwidth, and network bandwidth) and screen real estate (both on desktops and on mobile devices) the challenge is to select the appropriate set of facets to evaluate and present to the end-user. Different queries will in general have different optimal presentation layouts, where the most useful navigators are positioned in the most visible locations on the screen real estate.

In the simplest form, the ideas of the present invention are applied to a set of navigators on a search result page. The traditional information is calculated in all navigators as per the definition above. This information measure is mapped through a bell-shaped function such that navigators with too little or too much information are degraded in the overall ranking of the navigators in a particular search result page. The presentation scheme can include as many navigators as fits on the page, given the transformed ranking, or the scheme can employ a threshold such that only high-quality navigators are included.

Figure 5:
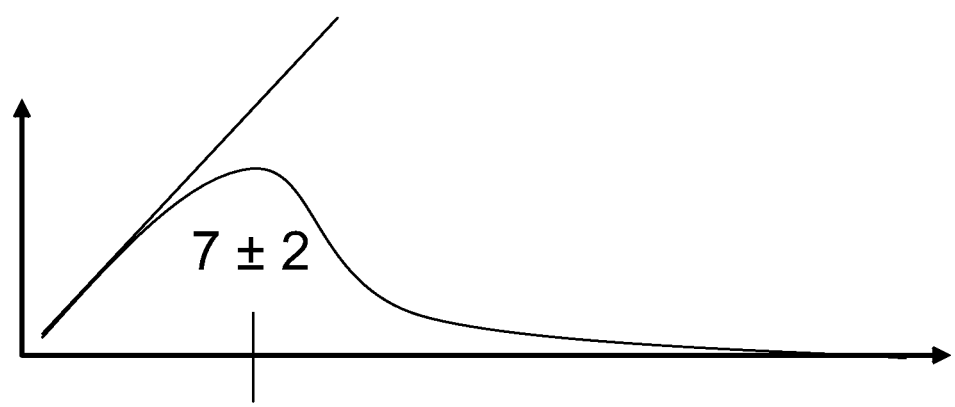

FIG. 5 shows an example of such a bell-shaped function mapping the traditional information measure to the human-centric information measure. The bell-shaped function is centered around 7 items (2.8 bits) with a width of approximately 2 items. The function is used to transform the traditional information measure of a navigator to a new rank value that better reflects the channel capacity of humans.

The present invention also teaches the targeting of a navigator for the presentation to a human search user. A navigator that contains more than 9 items can have some dominant entries that have information around 2-3 bits followed by several entries with low probability. These unlikely drill-down candidates at the tail of the navigator (assuming entries are ranked in high to low probability order) can be put in a new entry in the navigator named e.g. "Other". Starting at the tail (lowest probability), the probability of the last entry is added to the "Other" bin and removed from the navigator. This procedure repeats until the traditional information measure is reduced to reach the criteria for human information consumption, e.g. less than 3 bits. In some cases, it may not be desirable to present the "Other" entry, in which case only the remaining original entries are presented.

Figure 6:
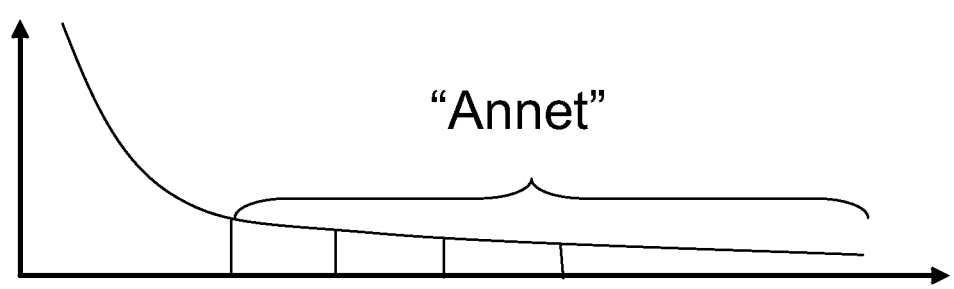

FIG. 6 shows the probability profile of the entries in a typical navigator. The entries with the lowest probabilities are grouped into a new "Other" entry. When the user selects the "Other" entry, the query is narrowed to include the values contained in the "Other" entry, as for traditional navigation. Alternatively, the query is narrowed to exclude the values listed together with the "Other" entry. Overall, this scheme teaches how to reduce the noise, as perceived by humans, in navigators on a search result page.

The present invention includes a scheme for selecting the navigation entries by means of a threshold on the probability of the entry. For example, only entries with more than 10% probability are to be included. The remaining entries are grouped into an "other" bin, and the overall information of the new navigator is used for content component ranking and positioning.

Ranking navigators after targeting them for human cognition, some navigators will be targeted such that they are ranked higher, while some navigators will not be possible to target to the desired information range and thus remain at the tail of the navigator ranking. The present invention teaches that navigator ranking and further navigator properties as described below are used in the presentation system such that visual effectiveness is optimized subject to constraints such as device output capabilities, including graphical display and audio output, input capabilities, and bandwidth, etc.

Traditionally, hierarchical navigators are presented fully expanded, i.e. all leaf nodes are visible. In general, such a navigator will produce information overload for a human search user. The present invention also teaches the targeting of hierarchical navigators for human information. For example, where a branch contains 20 direct child options (with roughly same probability), only the branch is presented without any descendants—the probabilities of all descendants are accumulated into the probability of the branch. The screen estate is better used for branches that better discriminate the document space per area of screen estate. The principle above of inserting an "Other" entry in a navigator can be applied to each branch node in a hierarchical navigator. An alternative is to put all noise entries into a top-level "Other" entry or to remove them entirely, using the current algorithm for identifying noise entries. After grouping noisy entries, branches may be collapsed such that the information is lowered. Collapsing a branch may suddenly reduce the information too much, below e.g. 2 bits. The brute force approach is to try all combinations of branch collapsing and select the configuration that achieves the optimal information measure around 3 bits. In practice, more efficient optimization can be achieved with e.g. the principles of dynamic programming.

Figure 7:
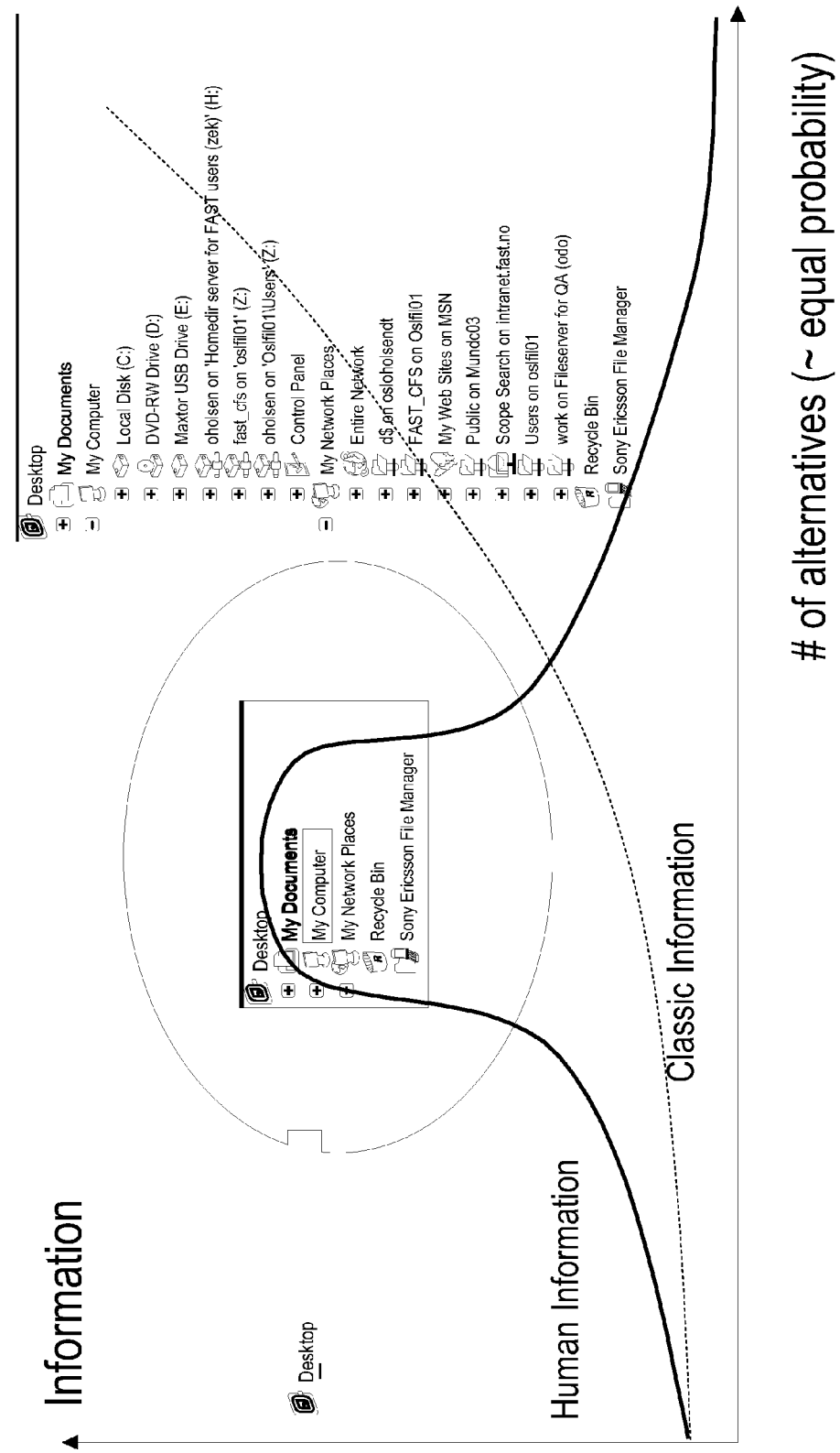

FIG. 7 shows a fully expanded hierarchical navigator 701 (on the right). It has too much information for a human to consume on the time scale that a user interacts with a search result page. Collapsing the least likely and noisy branches of the navigator 701 provides the transformed navigator 702 (in the center) which has sufficient information to make it interesting while not too much to make it difficult to comprehend. The navigator 702 can be further collapsed into navigator 703 (on the left) making it trivial and of no use, containing a single entry. The x-axis of the figure represents traditional information content. The figure also shows the human information receptivity peaking in the neighborhood for navigator 702 and having fairly low values for navigators 701 and 703.

In the special case where a parent node contains only one child, the parent and the child can be merged into one node in order to save screen real estate. In particular, this approach saves one level of indentation space in the presentation.

The present invention further includes a scheme for selecting navigation entries (choices) by the means of optimizing the information density in a navigator (as well as in a composite presentation of content components, a "meta-navigator"). Each entry (choice) in a particular navigator usually consumes the same screen estate, typically presented as a line within that content component. As more noisy entries (with low probability) are included, the information density, i.e. information per entry, will drop. For all possible groupings of the lowest probability entries, the information density will reach a maximum value which will select the grouping level and the corresponding information density will be used as a navigator rank value.

The present invention also includes a scheme for using the information density as above relative to the information density from the same number of equiprobable entries providing the maximum information in that many entries. The examples show that selecting the peak in this measure as a basis for selecting the grouping level is a robust heuristic. The information density from this grouping level is used for content component ranking and presentation.

The formal definition of information density for a navigator n with $|n|$ entries such that all entries with probability lower than the $|n|-1$'th entry (entries are sorted on descending $n\_i$) are grouped into the kith entry (the "Other" bucket) is $$h(n) = -\text{sum}\_i\, n\_i \log n\_i/|n|$$

The information density factor is the ratio of the actual information density to the maximum possibly information density for the given $|n|$. The maximum information density is achieved with $|n|$ equiprobable entries having the information $\log |n|$. Thus, the information density factor is $$f(n) = -\text{sum}\_i\, n\_i \log n\_i/|n|\,\log |n|$$

In summary, the present method searches for an N that, when transforming the navigator n to another navigator n(N) containing N entries (N<$|n|$) by aggregating noisy elements into a new entry ("Other"), maximizes the information density factor of the transformed navigator f(n(N)) and uses the information density of the transformed navigator h(n(N)) as the rank value for the transformed navigator.

Generally, only one of the original navigator n or the transformed navigator n(N) will be included in the overall ranking of navigators. However, both may be included in the overall navigator ranking but with the risk wasting screen estate and causing information overload. The variants of navigator ranking in the present invention can be normalized such that the best transformation alternative, from e.g. simple probability threshold, information density factor, etc, all compete for the presentation to the user. In general, the highest ranked transformation will exclude the other transformations of the same navigator.

The presentation of a navigator may for example take the form of a tag cloud (http://en.wikipedia.org/wiki/Tag_cloud). A tag cloud, unlike traditional navigators, is not presented as an explicit sequence. Rather, the entry probability is represented as the font size and boldness (as well as color, etc) of the value of the entry. The methods of the present invention still applies—the noisy entries are aggregated into a new "Other" entry that is presented in the cloud, thus making the information in the tag cloud more accessible to a human user.

The method of information density can be applied to hierarchical navigators. For each N, the method picks the graph configuration with the highest information density. The N with the highest information density factor is found, and the corresponding information density is used for ranking the hierarchical navigator among all other navigators.

Figure 8:
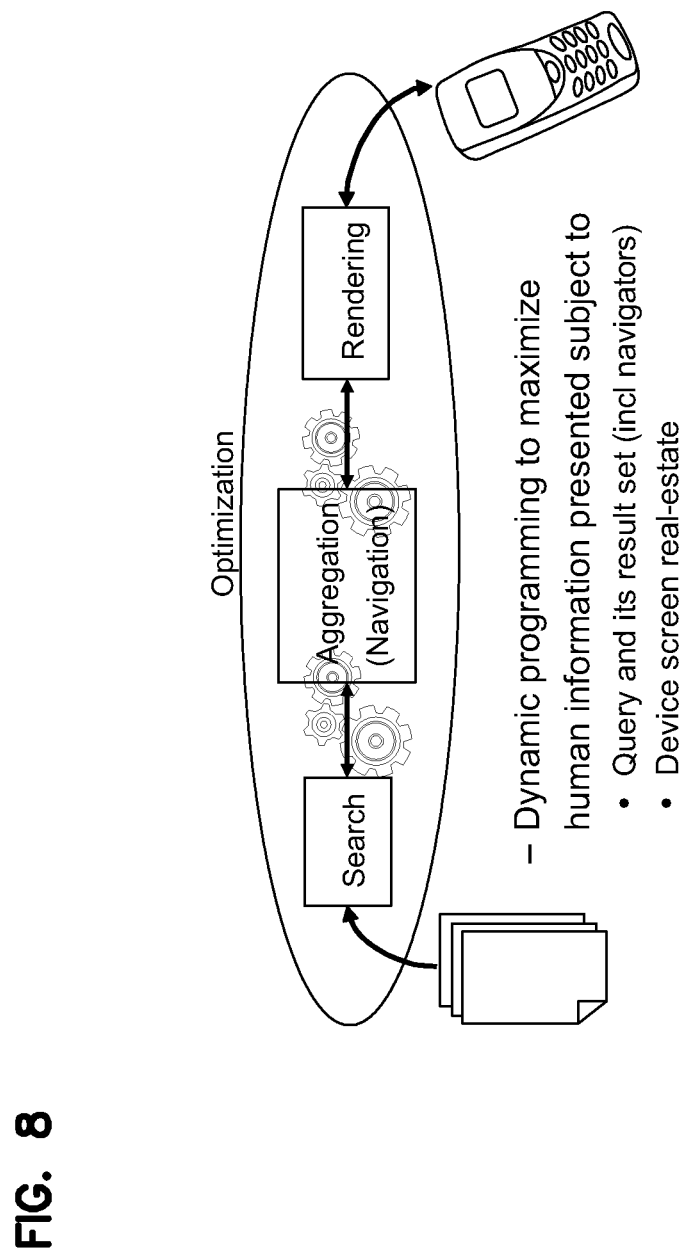

FIG. 8 shows the processing of the search results, via aggregation and building navigators, to the presentation to the end user. The processing can be feed-forward, i.e. a presentation is made to a user in a given context, the user provides input which modifies the context, the search executes in a given context providing a result set of documents, aggregation and navigation is performed according to parameters in or derived from the context, and the rendering processes present the result of the user interaction to the user. In this scenario, the aggregation and building of navigators has cues from the context as to what criteria to use for navigator transformation and ranking. The rendering process uses essentially the navigator ranking for selecting the best presentation.

FIG. 8 also shows the integrated processing of search, aggregation, and rendering. Rather than optimizing locally in aggregation on the navigators returned from the search, there may be global optimization across aggregation and rendering. Rendering may e.g. use different font size on the navigators which will enter the information density measure. Above, average information per entry was used as a criterion, assuming fixed font size for presentation, but for variable sized navigators, e.g. tag clouds, a more appropriate measure is the information per screen area. The overall size of a tag cloud is determined by both the aggregation and the rendering, thus requiring tightly coupled optimization. For audio output, e.g.

in mobile search, the corresponding measure would be information per unit of time. The interaction between aggregation of navigators and rendering will find optimal multi-modal rendering of the search result on e.g. screen and audio.

FIG. 9 shows some example country navigators as returned from different queries to the search engine, i.e. sorted in descending probability (hit count) order. Navigator 901 shows a handful of relevant entries followed by a number of noisy elements. Navigator 902 shows that about half the documents hit "USA" and about half many other countries. Navigator 903 has many entries with approximately the same probability (hit count) followed by a few noisy entries. Navigators 904 and 905 have 7 and 15, respectively, equiprobable entries. All these navigators except navigator 904 would be classified as noisy and far from optimal being presented as is to the human user. The traditional information in these navigators is shown as a navigator rank order in 906. The same facet would not compete against itself in such a rank order, but this rank order serves to compare the ranking as if navigators were appearing from different facets in the same search result.

FIG. 10 shows the example country navigators after being transformed to maximal information density. In navigator 1001, the entries in navigator 901 from "Germany" onwards are grouped into "Other" yielding a navigator with 6 entries, down from 15 in navigator 901. In navigator 1002, all entries in navigator 902 except "USA" are put into "Other", yielding a navigator with two roughly equally likely entries having an information measure of approximately 1.0 and information density of 0.5 as navigator 1002 occupies two lines. Transforming navigator 903 yields navigator 1003—the current method yields 10 entries with the grouping in "Other" starting where the fall-off in probability starts in navigator 903. The equiprobable navigators 904 and 905 are transformed into navigators 1004 and 1005, respectively. Navigator 1004 is identical to navigator 904 while navigator 1005 is cut down to 5 entries.

Ten entries in navigator 1003 are on the high side given the limits suggested by Miller, as mentioned above. The information densities in the transformed navigators are shown in the navigator ranking 1006. Navigator 1003 achieves a low score as it has a low information density due to relatively many entries. It is likely that there will exist better and more valuable navigators for that particular search result set than navigator 1003. Navigators 904/1004 and 905 have maximum information for their respective number of entries, but neither achieves the top ranking. Navigators 904/1004 looses to navigators with less entries, thus achieving higher information density. Navigator 1005 is ranked down due to imbalanced probabilities.

Traditionally, the document hit list has claimed the dominant presentation space for a search result. Navigators tend to be presented at the sides of a major area reserved for the hit list. Based on usage data, including click-through data in the search engine and web server (browse) statistics, a-priori probabilities, reasoning within the search engine, publishing logic (e.g. promotions), probabilities can be assigned to each document presented in the hit list, and the information can be calculated. The hit list can be ranked among the navigators, allowing particularly valuable navigators for this search to take some or all of the presentation space traditionally reserved for the hit list.

The search hit list and the navigators are all content components in a portal framework. The methods of the present invention can be applied to all such content components where query-specific, conditional, or a priori probabilities can be assigned to the content. These content components can be thus be ranked and assigned appropriate presentation space subject to the rendering constraints—as imposed by the device, the user (for example being visually impaired), available rendering modalities, the context, etc.

Examples of Applications

Mobile search: The presentation method according to the present invention will provide a optimum exploitation of the rather small screens of mobile devices and also take into account that the input capabilities whether via keyboard or display usually are limited and often has to be undertaken in a manner "peculiar" to mobile devices. Moreover, search and presentation on mobile device could also exploit possibilities for audio output and input.

Shopping including e-commerce: A general problem here is aligning sales with inventory. For instance in an e-commerce setting it is desirable to tailor the search experience in such a manner that the number of clicks the user has to go through between entering a query and finding an item to buy, is minimized This is thought to be conducive for optimizing the conversion rate of a site, i.e. the proportion of customers to the site that actually ends up making a purchase from the site. The minimization can be achieved by providing logic in the presentation such that an aggregation, for instance a navigator in the presentation, makes sense relative to the query and enables customers to quickly narrow in on an item offered for sale. The general idea is that the method of the present invention can be optimized in such a manner that a customer hangs on to the site if the presentation creates an overall impression of the effectiveness of a purchase process.

Classified advertisements: Generally navigators are the main user interface, but the method of presentation according to the present invention is of course not limited to aggregations such as navigators, but when the latter are used for classified advertisement the presentation should be optimized so as to provide a high quality response.

News search: News presented as text are highly dynamic and queries might be quite wide-ranging, so an optimum presentation method will be highly desirable.

Media search and search in rich content: Here the information is of course not limited to text, but may comprise images, video and audio and an optimum presentation should be able to integrate search results so as to present the user with choices from different types of sources, and yet offering the user a clearly set out and easy to follow view of the search results.

Business Intelligence: A presentation is optimized taking into account that business intelligence (BI) reports usually are static, predefined and directed to a rather narrow group of users.

Conclusions

The method according to the present invention offers a number of advantages not provided in the prior art. This includes i.a. the following:

Ranking of navigators based on user data and the information content of navigators.

Automated algorithms that shall improve discovery via navigators.

Optimal navigators for each query even if the latter is unpredictable.

An improved and more discriminatory use of the screen or display estate. Screen clutter that is never or seldom used can be removed or re-used by applying tools for improved discovery.

User behaviour can be fed back in a loop to improve screen or display utilization usage.

In addition the method according to the present invention could apply parameters for automatic choice and placement of content components, including navigators on the screen and generally applied to follow the rule that the highest valued navigator shall be given the most prominent place in the presentation.

As persons skilled in the art readily will understand, the method according to the present invention offer a number of possibilities with regard to further developments of accessing and presenting information in a human-centric context. For instance it should be possible to profile data with metadata summaries at global and contextual level. Dynamic programming could be applied for optimizing screen usage and it would be possible to provide human information navigators.

Another highly interesting prospect is the possibility of aggregating hierarchical alternatives in the form of hierarchical navigators. Only the alternative that matches the overall aggregation is used.

However, as persons skilled in the art also may understand, some of the perspective and outlooks mentioned here would fall outside the scope of the present invention. Finally, it should be noted that the exemplary embodiments thereof given hereinabove have their main emphasis on content components comprising aggregation in the form of navigators, but the presentation could just as well include other content components, such as for instance search query feedback and aggregation of scopes.

I claim:

1. A method for composing and presenting information in a user context, wherein the information comprises content of documents accessed and retrieved in an information search, the method comprising:
    determining a user context that is associated with the information search;
    selecting a set of content sources;
    populating a set of content components comprising a number of navigators that each represent content by retrieving and refining content components from the set of content sources;
    computing component information in the content components using an information measure that reflects the information as perceived by human cognition, the selected content components comprising navigators;
    before displaying the navigators, transforming one or more of the navigators by aggregating noisy elements into a new entry in part to control an information density factor associated with a transformed navigator as part of determining and composing a presentation of the content components subject to one or more of human cognition constraints, user context constraints, presentation constraints and content constraints by accumulating content and removing navigators from content components determined to have a low information density or a high information density before the navigators are displayed such that the number of navigators that are displayed are reduced; and
    displaying the presentation after removing the navigators.

2. The method according to claim 1, further comprising determining proposals for alternative search queries.

3. The method according to claim 1, wherein document lists are sorted and/or grouped according to different criteria.

4. The method according to claim 1, further comprising: using portal framework concept for the presentation.

5. The method according to claim 4, further comprising: limiting a number of choices in the presentation to choices of having a probability above a predetermined level.

6. The method according to claim 1, further comprising: including in the presentation one or more ranked navigators.

7. The method according to claim 1, further comprising: limiting a number of choices in the presentation to choices of having a probability above a predetermined level.

8. The method according to claim 1,
    wherein presenting the presentation for the user comprises:
        selecting a subset of the set of content components for determining and computing the presentation,
    wherein the method further comprises:
        determining a composite presentation;
        computing an overall information measure of the composite presentation, optimizing the overall information measure; and
        displaying the composite presentation to the user.

9. The method according to claim 1, wherein a number of navigation choices is limited to a maximum in the integer range 5-9.

10. The method according to claim 1, wherein a number of navigation choices are presented as hierarchical.

11. The method according to claim 1, wherein a number of navigation choices include numerical ranges.

12. The method according to claim 8, further comprising: using portal framework concept for the presentation.

13. The method according to claim 8, further comprising: including in the presentation one or more ranked navigators.

14. The method according to claim 13, further comprising: characterized by ranking navigators on basis of an information measure.

15. The method according to claim 13, further comprising: selecting navigator entries on basis of a probability threshold for each entry.

16. A system for composing and presenting information in a user context, wherein the information comprises content of documents accessed and retrieved in an information search, the system comprising:
    a display;
    and
    a process configured to perform actions, comprising:
        determining a user context that is related to the information search;
        selecting a set of content sources;
        populating a set of content components comprising navigators by retrieving and refining content components from the set of content sources;
        computing component information in the content components by means of an information measure that reflects the information as perceived by human cognition, the selected content components comprising navigators;
    before displaying the navigators on the display, transforming one or more of the navigators by aggregating noisy elements into a new entry_ in part to control an information density factor associated with a transformed navigator as part of determining and composing a presentation of the content components subject to one or more of human cognition constraints, user context constraints, presentation constraints and content constraints by accumulating content and removing navigators from content components determined to have a low information density or a high information density before the navigators are displayed; and
    displaying the presentation for the user on the display after removing the navigators.

17. The system according to claim 16, further comprising: including in the presentation one or more ranked navigators.

18. The system according to claim 16, further comprising ranking the navigators on basis of an information measure.

19. The system according to claim 16, further comprising: selecting navigator entries to display on basis of a probability threshold for each entry.

20. A computer-readable device storing computer executable instructions that when executed perform actions, comprising:
- determining a user context that is associated with an information search;
- selecting a set of content sources;
- populating a set of content components comprising navigators by retrieving and refining content components from the set of content sources;
- computing component information in the content components using an information measure that reflects the information as perceived by human cognition, the selected content components comprising navigators;
- before displaying the navigators on the display, transforming one or more of the navigators by aggregating noisy elements into a new entry in part to control an information density factor associated with a transformed navigator as part of determining and composing a presentation of the content components subject to one or more of human cognition constraints, user context constraints, presentation constraints and content constraints by accumulating content and removing navigators from content components determined to have a low information density or a high information density before the navigators are displayed; and
- displaying the presentation for the user on the display after removing the navigators.

\* \* \* \* \*